United States Patent
McQuerrey

(10) Patent No.: US 12,343,972 B2
(45) Date of Patent: Jul. 1, 2025

(54) METHOD OF COMPOSITE PANEL DETACHMENT FROM A HEATED AND COOLED PRESS

(71) Applicant: CONTINUUS MATERIALS INTELLECTUAL PROPERTY, LLC, The Woodlands, TX (US)

(72) Inventor: Brian McQuerrey, Sarasota, FL (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 110 days.

(21) Appl. No.: 18/128,063

(22) Filed: Mar. 29, 2023

(65) Prior Publication Data

US 2024/0149578 A1 May 9, 2024

Related U.S. Application Data

(60) Provisional application No. 63/423,596, filed on Nov. 8, 2022.

(51) Int. Cl.
*B32B 37/10* (2006.01)
*B32B 5/02* (2006.01)
(Continued)

(52) U.S. Cl.
CPC .......... *B32B 37/1027* (2013.01); *B32B 5/022* (2013.01); *B32B 7/12* (2013.01);
(Continued)

(58) Field of Classification Search
CPC ........ B29C 2043/483; B29C 66/83423; B29C 70/504; B30B 5/06; B30B 5/065;
(Continued)

(56) References Cited

U.S. PATENT DOCUMENTS

| 2006/0024506 A1 | 2/2006 | Blomqvist et al. |
| 2021/0189732 A1* | 6/2021 | Rayman, Jr. ............ E04D 13/16 |

FOREIGN PATENT DOCUMENTS

| DE | 40 37 836 A1 | 6/1992 |
| DE | 44 35 700 A1 | 4/1996 |

(Continued)

OTHER PUBLICATIONS

Machine translation of DE 4037836 date unknown.*

(Continued)

*Primary Examiner* — John L Goff, II
(74) *Attorney, Agent, or Firm* — FOLEY & LARDNER LLP

(57) ABSTRACT

A system for producing a composite board made of plastic and paper includes a hot press assembly. The hot press assembly includes a first heated belt configured to apply heat and pressure to a composite sandwich. The composite sandwich includes a mat comprising a mixture of paper and plastic and at least one facer positioned above or below the mat. The hot press assembly further includes a roller configured to drive the belt to move the composite sandwich through the hot press assembly and a first non-stick belt configured to separate at least a portion of the composite sandwich from the heated belt as the composite sandwich is moved through the hot press assembly.

15 Claims, 10 Drawing Sheets

(51) Int. Cl.
  *B32B 7/12* (2006.01)
  *B32B 27/10* (2006.01)
  *B32B 27/12* (2006.01)
  *B32B 27/18* (2006.01)
  *B32B 37/00* (2006.01)
  *B32B 37/06* (2006.01)

(52) U.S. Cl.
  CPC .............. *B32B 27/10* (2013.01); *B32B 27/12* (2013.01); *B32B 27/18* (2013.01); *B32B 37/0053* (2013.01); *B32B 37/06* (2013.01); *B32B 2250/40* (2013.01); *B32B 2260/028* (2013.01); *B32B 2260/046* (2013.01); *B32B 2262/101* (2013.01)

(58) Field of Classification Search
  CPC ....... B30B 5/067; B27N 3/24; B32B 37/1027; B32B 37/0053; B32B 37/06; B32B 2037/268; B32B 5/022; B32B 7/12; B32B 27/10; B32B 27/12; B32B 27/18; B32B 2250/40; B32B 2260/028; B32B 2260/046; B32B 2262/101
  USPC ...................................................... 156/583.5
  See application file for complete search history.

(56) References Cited

FOREIGN PATENT DOCUMENTS

| DE | 19854708 A1 | * | 5/2000 | ............... B27N 3/24 |
| DE | 10061389 A1 | * | 6/2002 | ............... B27N 3/24 |
| DE | 202020101169 U1 | * | 4/2020 | |
| EP | 0 347 936 A2 | | 12/1989 | |

OTHER PUBLICATIONS

Dictionary.com definition of "along" Jan. 13, 2025.*
Foreign Search Report on EP DTD Mar. 20, 2024.
Foreign Office Action issued for Canadian Application No. 3,211,021, dated Dec. 23, 2024, 5 pg.

* cited by examiner

METHOD OF COMPOSITE PANEL DETACHMENT FROM A HEATED AND COOLED PRESS

CROSS-REFERENCE TO RELATED PATENT APPLICATIONS

This application claims the benefit of U.S. Provisional Patent Application No. 63/423,596, filed on Nov. 8, 2022, the entirety of which is hereby incorporated by reference herein.

BACKGROUND

Effective and environmentally sound waste disposal is a common dilemma faced by most industrialized and developing nations. In recent history, waste has primarily been disposed of in landfills, which require substantial tracts of land that might otherwise be used for other meaningful purposes. Regulatory and political bodies, as well as generators of waste, are increasingly interested in reducing waste volumes, diverting waste from landfills and incinerators while promoting more sustainable usage of waste products. Unfortunately, despite efforts of governments and communities to institute and promote waste recycling programs, there remains a tremendous amount of recyclable material that is not recycled.

There is a critical need to utilize this vast resource and at the same time save the land now occupied as landfill space. It is therefore desirable to develop technologies that not only reduce the amount of waste destined for a landfill or incinerator, but also to capture and use such material for beneficial purposes

BRIEF DESCRIPTION OF THE DRAWINGS

FIG. 3 is a section view of a portion of the composite board manufacturing system of FIG. 2, in accordance with some embodiments of the present disclosure.

Figure 1:
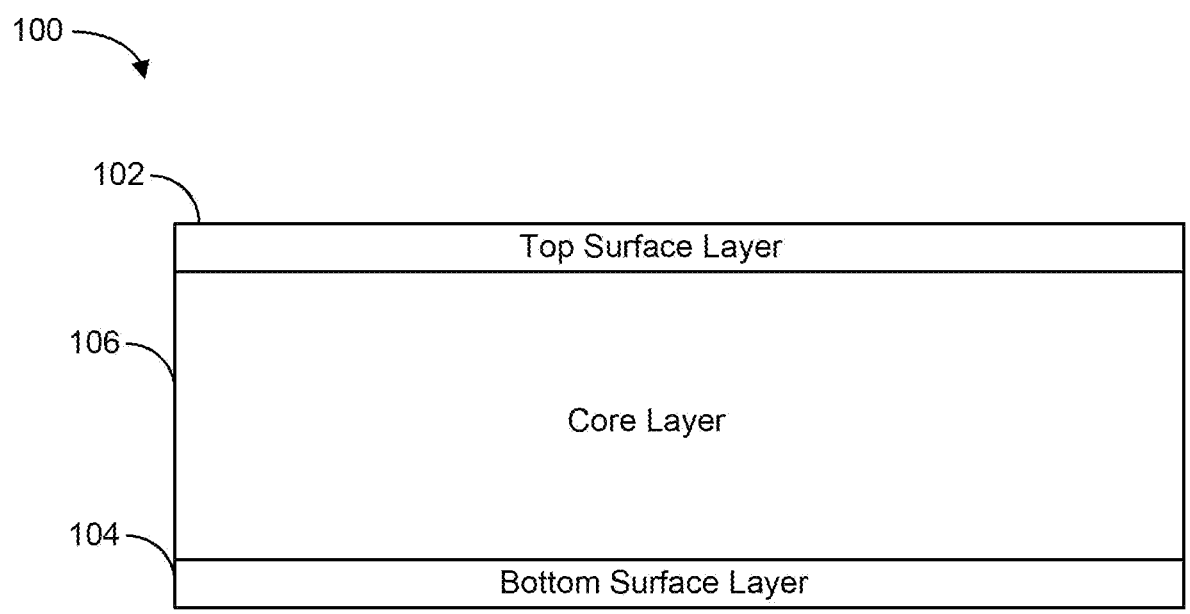
FIG. 1 is an example composite mat, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Current solutions to reducing the amount of waste stored in landfills or burned in incinerators often involve converting the waste into a useful product. For instance, in one example, the waste may be captured, melted, and congealed into a composite board comprising a mixture of the captured waste. If the composite board is properly melted and congealed, the composite board may be capable of being exposed to outdoor elements (e.g., sun, rain, snow, sleet, temperature changes, heat, cold, etc.) for prolonged time periods without any substantial deformations. Construction companies may use such composite boards to build roofing and/or side paneling for houses or large buildings. Thus, instead of taking up space in landfills that are increasingly overflowing, waste may be manipulated by manufacturers into a composite board that can benefit many different types of consumers (e.g., homeowners, companies working in offices, warehouse owners, etc.).

One sample process for manufacturing composite boards is described in U.S. patent application Ser. No. 17/069,567, filed Oct. 13, 2020, the entirety of which is incorporated by reference herein. This process generally involves forming a mat comprised of fragments. In some cases, the fragments are a mixture of discrete paper fragments (e.g., cellulosic fragments) and/or plastic fragments (e.g., thermoplastic polymer fragments). In other cases, each fragment is comprised of separate layers of paper and thermoplastic polymer. The mat may include paper/plastic fragments sandwiched between top and bottom layers (e.g., facer layers). These top and bottom layers may include paper, fiberglass, films, and/or other nonwovens or facer fabrics. Typically, thermoplastic adhesive layers are positioned between the paper/plastic fragment-based core and the top and bottom surface layers. The mat may be assembled in a relatively cold state and the spatial order of the components may be mostly preserved throughout the subsequent thermal processing steps. The moisture content of the mat can range from about 0 percent to about 25 percent. The mat is first subjected to a hot-pressing step under conditions that compress the mat and melt a significant portion of the thermoplastic polymer, especially fragments made of polyethylene. In a subsequent step, the hot mat may be subjected to a cold-pressing step under conditions that simultaneously maintain the compressed state of the mat and congeal (e.g., freeze) the molten thermoplastic in the mat.

In the embodiments described herein, the mat of paper and plastic may be continuously deposited onto a moving conveyor belt and moved through a continuous hot press. The hot press may include continuous heated belts, usually made of steel, above and below the mat that are heated to temperatures as high as 480 degrees Fahrenheit. The continuous steel belts may move at approximately the same speed as a conveyor belt such that the mat of paper and plastic is continuously fed into and pressed by the heated belts. Because of the high temperature of the heated belts, melted plastic that comes into direct contact with the belts may burn and stick onto the belts, which makes removal difficult and may create surface imperfections on any subsequently made board. While facer layers positioned above and below the paper and plastic mat may provide separation between the heated belts and the plastic of the mat, certain facer materials, such as fiberglass, may be porous enough that some plastic may seep through the facer and come into contact with the heated belts. In addition to damaging the belts, the boards themselves can be damaged due to burnt plastic sticking to the facers. Further, due to the width of the conveyor belt and hot press, many commercially available facer materials may not be wide enough to cover the entire mat. In some cases, it may be desirable to include gaps in the facer materials to allow for steam to escape from the mat more easily. However, any exposed portions of the mat that come into contact with the heated belts may cause melted plastic to stick to the belts.

Thus, there is a need to prevent contact between the paper and plastic mat and the heated belts, or otherwise prevent the sticking of melted plastic onto the heated belts. In the manufacturing of composite wood boards, chemical release agents may be applied to the heated belts to prevent sticking. However, composite wood boards are typically sanded after being pressed to control the thickness and the surface finish of the completed board. The sanding process removes any release agents that are transferred from the heated belts to the surface of the composite wood board. In contrast, it may not be required or desired to sand the outer surfaces of the plastic composite boards described herein. Thus, the release agents may remain on the outer surfaces of the plastic composite boards when manufacturing is complete. The release agents may interfere with any use of the plastic composite board in the field that requires the use of adhesives. Accordingly, there is a need for a process that prevents plastic from sticking to the heated belts without the use of chemical release agents.

In the embodiments described herein, a continuous belt made from a non-stick material may be positioned between the heated belt and the paper and plastic mat. The non-stick belt may be wide enough to cover the entire mat or may be locally positioned in areas where exposed plastic is expected. The non-stick belt may be made from, made in part from, lined with, or coated with, for example, Polytetrafluoroethylene ("PTFE"), more commonly known as Teflon. In some embodiments, the non-stick belt may be made from other non-stick materials, including other high-temperature polymers such as perfluoroalkoxy alkanes ("PFA"), fluorinated ethylene propylene ("FEP"). In other embodiments, the heated belt itself may be coated with a non-stick material, such as PTFE, PFA, FEP, or chrome.

Referring now to FIG. 1, an example composite board 100 is shown, in accordance with some embodiments of the present disclosure. Composite board 100 may be manufactured to operate as a roof cover board that can provide impact protection (from hail, foot traffic, and/or heavy equipment), temporary water resistance, fire resistance, wind-uplift constraint, thermal dimensional stability, and/or flexibility that is often required in roofing applications. Composite board 100 may be manufactured such that mechanical fasteners can be used to couple composite board 100 to other components (e.g., a wood frame) and/or such that adhesives can be used to adhere other components to the outer surfaces of composite board 100.

Composite board 100 may comprise three discrete layers, a top surface layer 102, a bottom surface layer 104, and a core layer 106. Top surface layer 102 and bottom surface layer 104 may be made from nylon film, polyester film, cellulose acetate film, nylon, or polyester non-woven fabrics, and/or textiles, such as those based on cotton, or other materials desirable for the outer surface of the finished composite board 100. In some embodiments, the top surface layer 102 and the bottom surface layer 104 may be about 0.005-0.100" thick. Core layer 106 may be about 0.100-1.500" thick and may comprise discrete paper fragments and plastic fragments such as polypropylene or polyethylene fragments, which may be connected through the use of a thermoplastic bonding resin, such as polyethylene. Core layer 106 may be manufactured by heating and cooling a mat (e.g., mat 204) of discrete paper fragments and plastic fragments as discussed below with reference to FIG. 2.

The structure of composite board 100 may be designed to achieve compression load support, sudden impact resistance, wind uplift resistance, fastener retention, adhesive compatibility, temporary rain protection, low flame spread, thermal dimensional stability, and an exceptional level of mechanical flexibility. The design promotes rapid and easy installation of the cover board in a commercial low slope roof application. It may be especially advantageous in re-roofing applications due to its level of flexibility, which may allow it to more easily conform to a curved contour of the perimeter region of the roof. The upper (when installed) outer surface of the board may allow for the absorption of adhesives but may temporarily resist transfer of rainwater into the core layer of the board.

Figure 2:
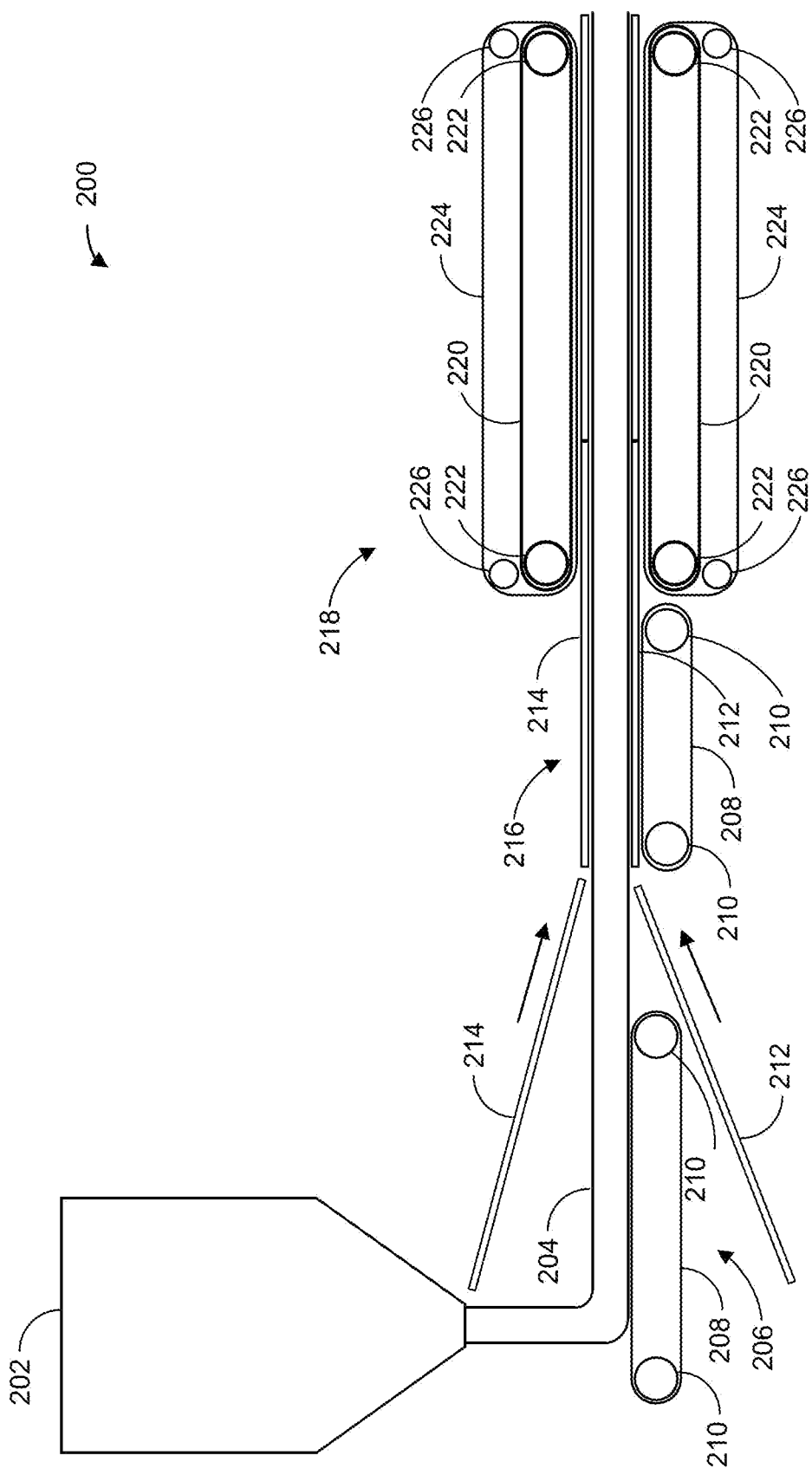
FIG. 2 is a side view illustration of a portion of a composite board manufacturing system, in accordance with some embodiments of the present disclosure.

Referring now to FIG. 2, a composite board manufacturing system 200 is shown, in accordance with some embodiments of the present disclosure. It should be understood that the various components of the composite board manufacturing system 200 are not to scale. Further, certain components in the system, including cooling and cutting components, are not shown. Composite board manufacturing system 200 may include a forming bin 202 configured to receive a mixture of plastic and paper and to dispense a continuous mat 204 of paper and plastic onto a conveyor system 206. The continuous mat 204 may be heated, pressed, and cut to form the core layer 106 of the composite board 100. The conveyor system 206, may include one or more belts 208 arranged end to end, each belt 208 travelling around two or more rollers 210. One or more of the rollers 210 may be driven, for example, by a motor or engine. The conveyor system 206 moves the continuous mat 204 through the various stages of manufacturing of the composite board 100. As used herein, the term "downstream" refers to the direction that the conveyor system 206 moves the continuous mat 204, and the term "upstream" refers to a direction opposite the direction that the conveyor system 206 moves the continuous mat 204. Lower facers 212 may be inserted from underneath the conveyor system 206 such that the lower facers 212 are positioned between the continuous mat 204 and the conveyor belt 208. In some embodiments, the lower facers 212 may be positioned on the conveyor system 206 upstream of the forming bin 202, such that the continuous mat 204 is deposited directly onto the lower facers 212. Upper facers 214 may be positioned on top of the continuous mat 204 to form a composite sandwich 216 including the continuous mat 204 sandwiched between the lower facers 212 and the upper facers 214. Thus, when the continuous mat 204 is pressed, cooled, and cut, a lower facer 212, or a portion of a lower facer 212, may form the bottom surface layer 104 of the composite board 100. The upper facer 214, or a portion of the upper facer 214, may form the top surface layer 102 of the composite board. In some embodiments, only the upper facers 214 or only the lower facers 212 may be added, such that the finished composite board 100 does not include either a top surface layer 102 or a bottom surface layer 104. In some embodiments, the mat of paper and plastic that is pressed to form the core layer 106 may not be continuous. For example, the core layer 106 material may be deposited on to the conveyor belt 208 with periodic interruptions if needed for manufacturability.

After the lower facers 212 and/or the upper facers 214 are positioned respectively underneath and on top of the continuous mat 204, the conveyor system 206 may move the composite sandwich 216 to a hot press assembly 218. The hot press assembly 218 may include heated belts 220, each travelling around two or more rollers 222 in a continuous circuit, positioned above and below the composite sandwich 216. One or more of the rollers 222 may be driven, for example, by a motor or engine. In some embodiments, the heated belts 220 may be made of steel. The heated belt 220 may be heated to a temperature in the range of about 350 degrees Fahrenheit to about 480 degrees Fahrenheit. A heating element (e.g., a resistive heating element, an inductive heating element, etc.) may be placed in contact with or in proximity to the heated belt 220 to heat the heated belt 220 to the desired temperature. For example, a resistive heating element may be positioned between the upper and lower segments of each heated belt 220 or adjacent the segment of the heated belt 220 not in contact with the composite sandwich 216. In some embodiments, the rollers 222 may include heating elements, and heat may be transferred from the rollers 222 to the heated belts 220. The system 200 may include temperature sensors to measure the temperatures of the heated belts 220. The measurements can be used to control the heating elements to maintain the heated belts 220 at the desired temperature. The heated belts 220 and rollers 222 may function similarly to the conveyor system 206, with the rollers 222 being configured to drive the heated belts 220 to move the composite sandwich 216 continuously through the hot press assembly 218. At the same time, the heated belts 220 and rollers 222 apply heat and high pressure to melt the plastic in the continuous mat 204 and compress the composite sandwich 216. In some embodiments, there may be only one heated belt 220 either above or below the composite sandwich 216, with the other side of the composite sandwich 216 not being heated. In these embodiments, a non-heated belt (e.g., similar to conveyor belt 208) may be used to apply pressure, but not heat, to the opposite side of the composite sandwich. As discussed above, plastic from the continuous mat 204 that comes into contact with the heated belts 220 may burn and stick onto the heated belts 220. This can cause damage to the heated belts 220 and can affect the quality of the finished composite board 100.

To reduce or prevent the burning and sticking of plastic to the heated belts 220, the hot press assembly 218 may include a non-stick belt 224 positioned between each heated belt 220 and the composite sandwich 216, thus separating each heated belt 220 from at least a portion of the composite sandwich 216. In some embodiments, the non-stick belt 224 may be a looped belt surrounding the heated belt 220. Each non-stick belt 224 may be guided by additional rollers 226 around a continuous circuit surrounding the circuit traveled by a heated belt 220 to continuously return the non-stick belt 224 to the upstream side of the hot press assembly 218. In some embodiments, the additional rollers 226 may be unpowered idler rollers, and the non-stick belts 224 may not be configured to be driven independently of the heated belts 220. The non-stick belt 224 may be compressed between the heated belt 220 and the composite sandwich 216 and moved along the hot press assembly 218 by the heated belt 220 via friction. For example, as discussed above, one or more of the rollers the rollers 222 connected to each heated belt 220 may be powered by a motor or engine. The rotation of the rollers 222 may cause the heated belt 220 to travel in a circuit around the rollers. The distance between the non-stick belts 224 above and below the composite sandwich 216 may be less than the height of the composite sandwich 216. Thus, when the composite sandwich 216 is fed into the upstream side of the hot press assembly 218, the layers of the composite sandwich 216 may be compressed, and the non-stick belts 224 may be pressed between the heated belts 220 and the composite sandwich 216. The heated belts 220 may then move both the composite sandwich 216 and the non-stick belts 224 toward the downstream end of the hot press assembly 218. The non-stick belts 224 may maintain separation between the composite sandwich 216 and the heated belts 220, thus preventing or reducing the sticking of plastic to the heated belts 220. After the composite sandwich 216 exits the hot press assembly 218, the composite sandwich 216 can be cooled and cut into various shapes and sizes.

Figure 3:
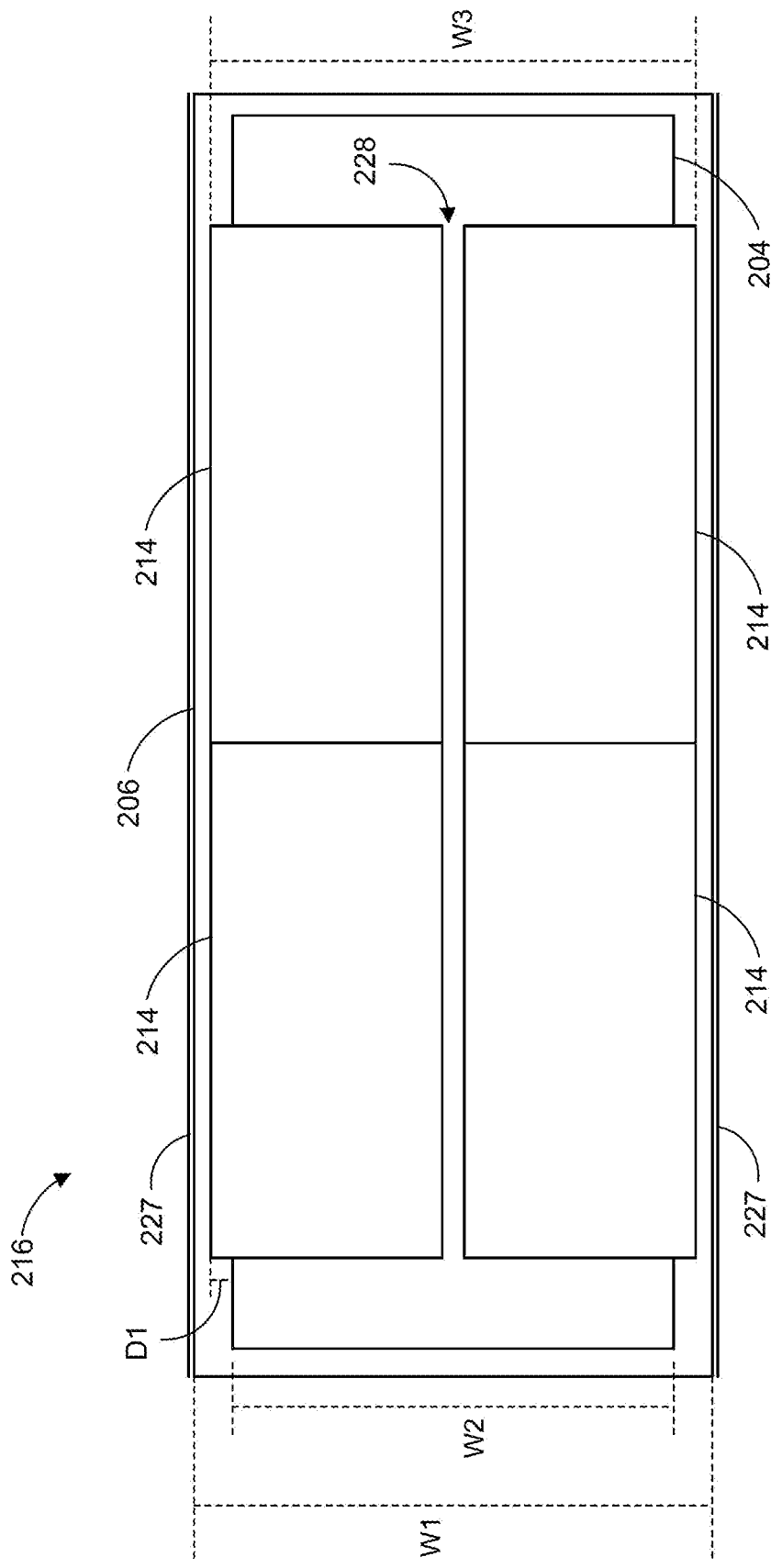
FIG. 3 is a plan view of a portion of the composite board manufacturing system of FIG. 2.
Figure 4:
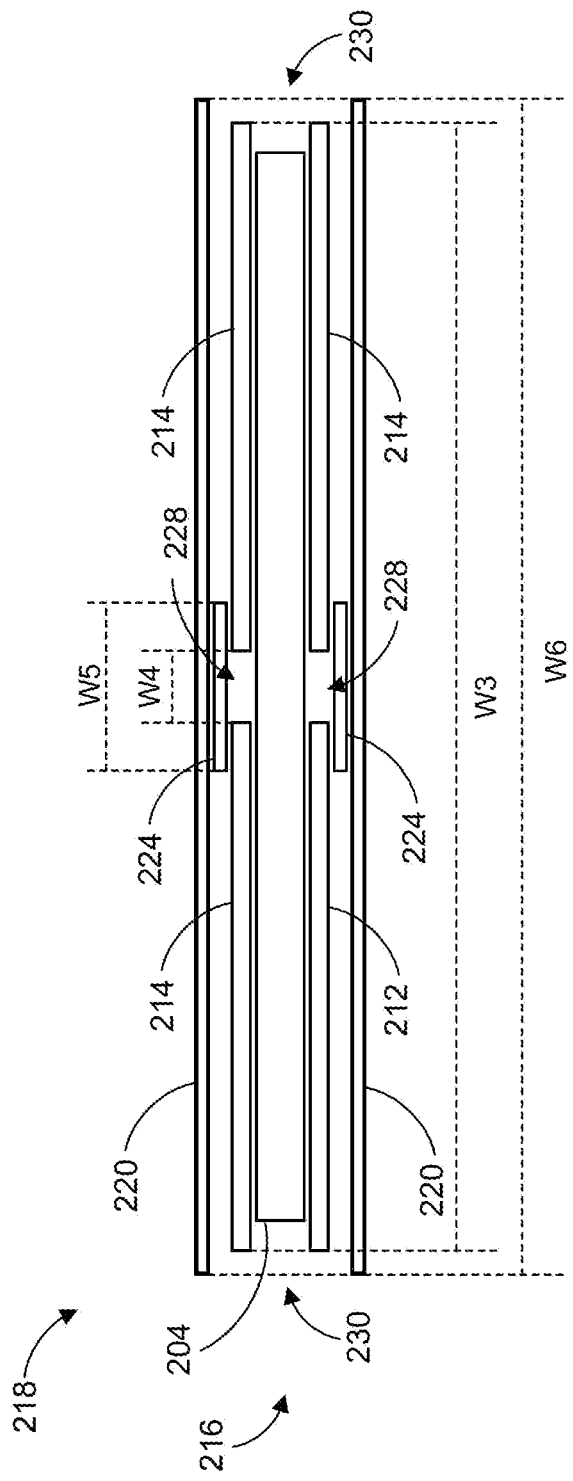
FIG. 4 is a section view of a portion of the composite board manufacturing system of FIG. 2, in accordance with some embodiments of the present disclosure.
Figure 5:
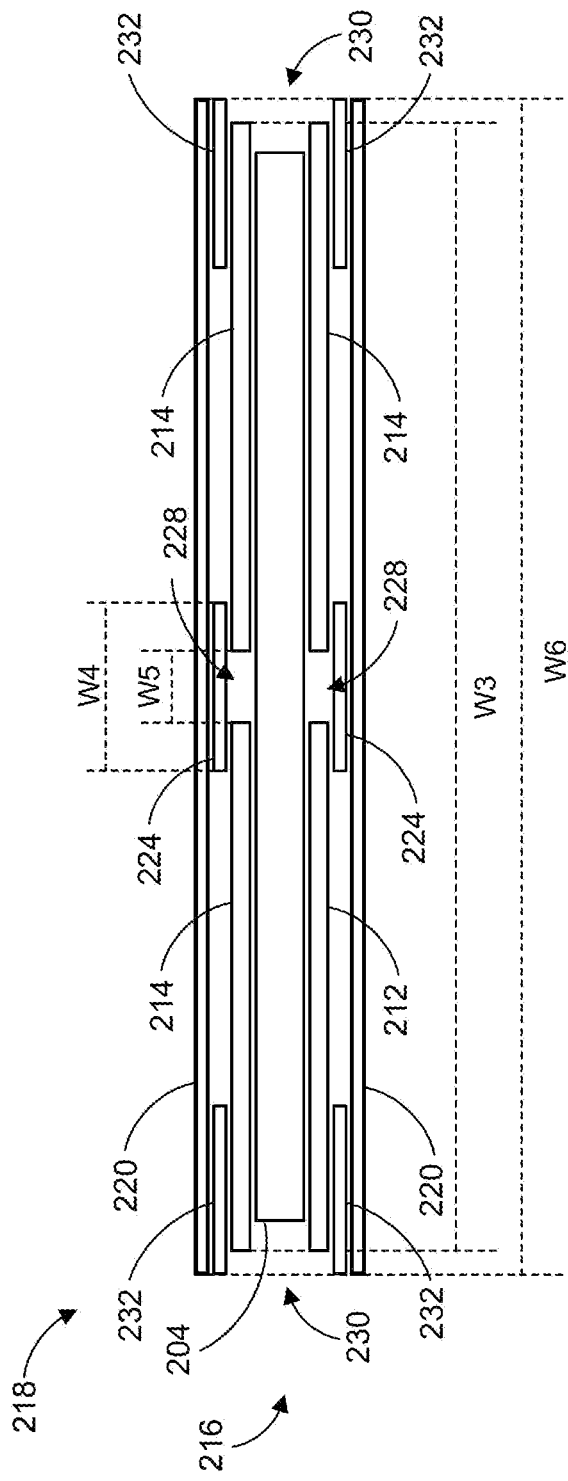
FIG. 5 is a section view of a portion of the composite board manufacturing system of FIG. 2, in accordance with some embodiments of the present disclosure.
Figure 6:
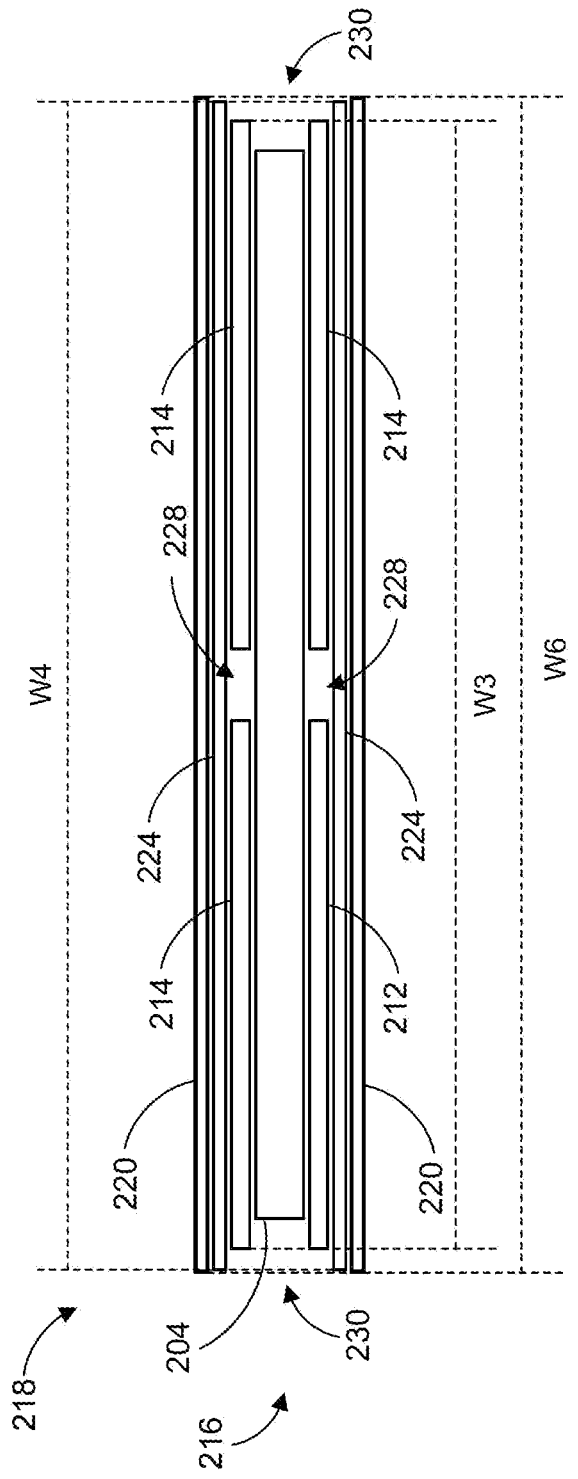
FIG. 6 is a section view of a portion of the composite board manufacturing system of FIG. 2, in accordance with some embodiments of the present disclosure.

Referring now to FIG. 3, a composite sandwich 216 is shown from above on a portion of a conveyor system 206, in accordance with some embodiments of the present disclosure. The composite sandwich 216 is shown prior to being heated and pressed by the hot press assembly 218. The conveyor belt 208 may have first width W1, and the continuous mat 204 may have a second width W2 that is less than the width W1 of the conveyor belt 208. For example, the belt may have a width W1 of about 110 inches, and the continuous mat 204 may have a width W2 of about 100 inches. As shown in FIGS. 4-6, the heated belts 220 may have a width W6 that is approximately equal to width W1 of the conveyor belt 208. The conveyor system may include side plates 227 on either side of the belt 208 to stop any of the paper and plastic material of the continuous mat 204 from falling off the sides of the belt 208. When the continuous mat 204 is compressed by the hot press assembly 218, the continuous mat 204 materials are displaced and squeezed toward the sides of the lower and upper facers 212, 214. Thus, it may be desirable for the outside edges of the upper facers 214 and the lower facers 212 (not visible in FIG. 3) to extend beyond the outside edges of the continuous mat 204 by a distance D1. The distance D1 may be about 1 inch to about 7 inches to stop the plastic in the continuous mat 204 from seeping out the sides of facers 212, 214 and contacting the heated belts 220 when the composite sandwich 216 is compressed. If the continuous mat 204 is about 100 inches wide, for example, facers 212, 214 with a width of about 105 inches may be desirable. However, many materials that can be used for the facers 212, 214 may not generally be commercially available in that width. For example, fiberglass facers may be available with a maximum width of about 49 inches to about 52 inches.

In some embodiments, the forming bin 202 may dispense the materials of the composite mat 204 with the composite mat 204 having an uncompressed width. The hot press assembly 218 may compress the composite mat 204 to a compressed width that may be wider than the uncompressed width. Material in the composite mat may spread outward as it is compressed and the thickness of the mat 204 decreases. The width W2 of the composite mat 204 discussed herein may refer to the compressed width.

To manufacture composite boards 100 using commercially available materials for facers, while using as much of the width W1 of the conveyor belt 208 as possible, two upper facers 214 may be laid on top of the continuous mat 204 side-by-side, and two lower facers 212 may be positioned under the continuous mat 204 side-by side, as shown in FIG. 3. In some embodiments, the side-by-side facers 212, 214 may overlap at the center to stop plastic from the continuous mat 204 from seeping through the seams between the side-by-side facers 212, 214 and contacting the heated belt 220. However, even with facers 212, 214 that are 52 inches wide, which may be the widest commercially available size, any overlap would reduce the combined width to less than 104 inches, which may not be enough to prevent plastic seepage at the outer edges of the facers 212, 214. Further, moisture in the continuous mat 204 may flash to steam when the composite sandwich 216 is heated and pressed. While some facers 212, 214 may be made from materials porous enough that at least some steam can escape through the facers themselves, in some embodiments, steam may escape primarily from around the edges of the facer 212, 214. With the side-by-side facers 212, 214 overlapping, the steam would only be able to escape via the outer edges of the facers 212, 214. Steam near the center of the continuous mat 204 would thus need to travel nearly 52 inches to escape from the mat 204. In some cases, the steam could push the facers 212, 214 away from the continuous mat 204, causing separation between the continuous mat 204 and the facers 212, 214 or causing distortion of the composite sandwich 216, affecting the quality of the finished composite boards 100.

In some embodiments, the side-by-side facers 212, 214 may be butted up against each other without overlapping. This may allow some steam to escape via the seam between the side-by-side facers 212, 214 at the center of the continuous mat 204. However, depending on the combined overall width W3 of the facers 212, 214 (defined as the distance from a left outside edge of a leftmost facer 212, 214 to a right outside edge of a rightmost facer 212, 214), this may not provide enough distance D1 to prevent plastic seepage from the outside edges. For example, if a target overall width W3 of 105 inches is desired, two 52-inch-wide facers 212, 214 butted up against each other would still not reach the desired width W3. As shown in FIG. 3, the side-by-side facers 212, 214 may be arranged with a gap 228 therebetween. This may allow for steam to escape more easily through the gap 228 and can provide a large enough overall width W3 to prevent plastic seepage from the outer edges of the facers 212, 214. However, this leaves a strip of the continuous mat 204 in the gap 228 exposed to the heated belts 220. It should be understood that only four upper facers 214 are shown in FIG. 3 in order to better illustrate the placement of the facers 212, 214 on the continuous mat 204. However, a substantially continuous row of facers 212, 214 may be inserted above and below the continuous mat 204 as it moves along the conveyor system 206.

Referring now to FIG. 4, a section view of a composite sandwich 216 within a hot press assembly 218 is shown, in accordance with some embodiments of the present disclosure. Again, it should be understood that the components are not to scale, and certain components of the system are omitted for clarity. As shown in FIG. 4, the non-stick belts 224 are wide enough to cover the gap 228 between the upper facers and the gap 228 between the lower facers, but do not cover the entire heated belts 220 or the entire facers 212, 214. More specifically, the non-stick belt 224 has a width W4 that is larger than the width W5 of the gaps 228 between the facers 212, 214, but is smaller than the overall width W3 of the facers 212, 214 and the width W6 of the heated belts 220. A non-stick belt 224 of this size may be sufficient to prevent plastic in the continuous mat 204 from contacting the heated belts 220 through the gap 228 while minimizing the size and cost of the non-stick belt 224. Due to the gaps 228 in the facers 212, 214, steam is allowed to escape from the continuous mat 204 through the gaps 228, as well as from the edges 230 of the composite sandwich 216.

As an example of the above, the heated belts 220 may have a width W6 of approximately 110 inches. The continuous mat 204 may be approximately 100 inches wide, and each facer 212, 214 may be approximately 52 inches wide. The gap 228 may have a width W4 between about one half inch and about 6 inches, resulting in overall facer width W4 of about 104.5 inches to about 110 inches. Thus, the distance D1 from the outside edge of the facers 212, 214 may be between about 2.25 inches to about 5 inches on each side. The non-stick belt 224 may have a width W5 that is at least as wide as the width W4 of the gap 228 and that may be up to about 6 inches wider than the width W4 of the gap 228. The width W for the gap 228 can be adjusted based on the expected expansion of the continuous mat 204 when the composite sandwich 216 is compressed. For example, if the continuous mat 204 is expected to expand to a width of 106 inches when the composite sandwich 216 is compressed, the gap 228 between the facers 212, 214 may be set at approximately 2 inches or more, resulting in an overall facer width W3 of approximately 106 inches or more, so that plastic in the continuous mat 204 does not seep around the edges of the facers 212, 214. It should be understood that although FIGS. 3 and 4 show two rows of lower facers 212 and two rows of upper facers 214, in some embodiments, there may be more rows of facers 212, 214. For example, if the composite board manufacturing system 200 may be operated with three rows of lower facers 212 and three rows of upper facers 214, resulting in two gaps 228 in the lower facers 212 and two gaps 228 in the upper facers 214. The hot press assembly 218 may include four non-stick belts 224, with one non-stick belt 224 positioned above each gap 228. Alternatively, the hot press assembly 218 may include one non-stick belt 224 wide enough to cover both of the lower gaps 228 and the center lower facer 212, and the second non-stick belt 224 wide enough to cover both of the upper gaps 228 and the center upper facer 214.

The non-stick belts 224 may include a material or materials to which melted plastic from the continuous mat 204 does not or cannot adhere. Thus, when the composite sandwich 216 exits the hot press assembly 218, substantially no plastic residue may remain on the non-stick belts 224. For example, the non-stick belts 224 may be made from, may include, may be a composite of, may be lined with, or may be coated with PTFE, PFA, or FEP. For example, the non-stick belts 224 may be made from or include a PTFE composite that is porous enough to allow steam to escape through the material of the non-stick belts 224. Steam can thus escape from the continuous mat 204 through the gap 228 between the facers 212, 214 and then into and through the non-stick belts 224. Steam that escapes form the composite mat 204 may also travel along the gap 228 and escape at the upstream and downstream ends of the heated belts 220.

Referring now to FIG. 5, a section view of a composite sandwich 216 within a hot press assembly 218 is shown, in accordance with some embodiments of the present disclosure. Again, it should be understood that the components are not to scale, and certain components of the system are omitted for clarity. As shown in FIG. 4, the hot press assembly 218 may include non-stick edge belts 232 in addition to the non-stick belts 224. The non-stick edge belts 232 may protect the heated belts 220 from contact with plastic that may seep out of the continuous mat 204 around the outside edges of the facers 212, 214. Again, this may reduce the cost of protecting the heated belt 220 and the weight of the hot press assembly 218 compared to a non-stick belt 224 that covers the entire heated belt 220. In these embodiments, the width W5 of the gap 228 does not necessarily have to be increased to account for the expansion of the continuous mat 204 when the composite sandwich 216 is compressed. For example, if the continuous mat 204's expected to expand to a width of 106 inches, the width W5 of the gap 228 can be set at 1 inch, resulting in an overall facer width of 105 inches if the facers 212, 214 are 52 inches wide, and any plastic from the continuous mat 204 that seeps around the edges of the facers 212, 214 will remain separated from the heated belts 220 by the non-stick edge belts 232. In some embodiments, the facers 212, 214 may be butted up against one another without a gap 228 and the hot press assembly 218 may include non-stick edge belts 232 without a center non-stick belt 224. In some embodiments, non-stick edge belts 232 may be included when only one facer 212, 214 is used on each of the top and bottom of the mat 204, rather than two facers 212, 214 arranged side by side.

Referring now to FIG. 6, a section view of a composite sandwich 216 within a hot press assembly 218 is shown, in accordance with some embodiments of the present disclosure. Again, it should be understood that the components are not to scale, and certain components of the system are omitted for clarity. In the embodiment shown in FIG. 6, the non-stick belts 224 are wider than the overall width W3 of the facers 212, 214. The non-stick belts 224 may thus separate the entire facers 212, 214, the gaps 228 between the facers 212, 214, and a region beyond the edges of the facers 212, 214 from the heated belt 220. In some embodiments, the non-stick belts 224 may have a width W4 that is approximately equal to the width W3 of the heated belts 220, such that the entire heated belts 220 can be protected from contact with any plastic moving through the hot press assembly 218. In some embodiments, the non-stick belts 224 may have a width W4 that is larger or smaller than the width W6 of the heated belts 220, but still larger than the overall width W3 of the facers 212, 214. In these embodiments, the non-stick belts 224 may protect the heated belts 220 from contact with plastic that seeps through the gaps 228 between the facers 212, 214 and around the edges 230 of the composite sandwich. In embodiments in which the facers 212, 214 are porous, the non-stick belts 224 may protect the heated belts 220 from contact with plastic that seeps through the facers 212, 214 themselves. As discussed above, the facers 212, 214 and the non-stick belts 224 may be porous such that steam from the continuous mat 204 can escape through the facers 212, 214 and through non-stick belts 224.

Figure 7:
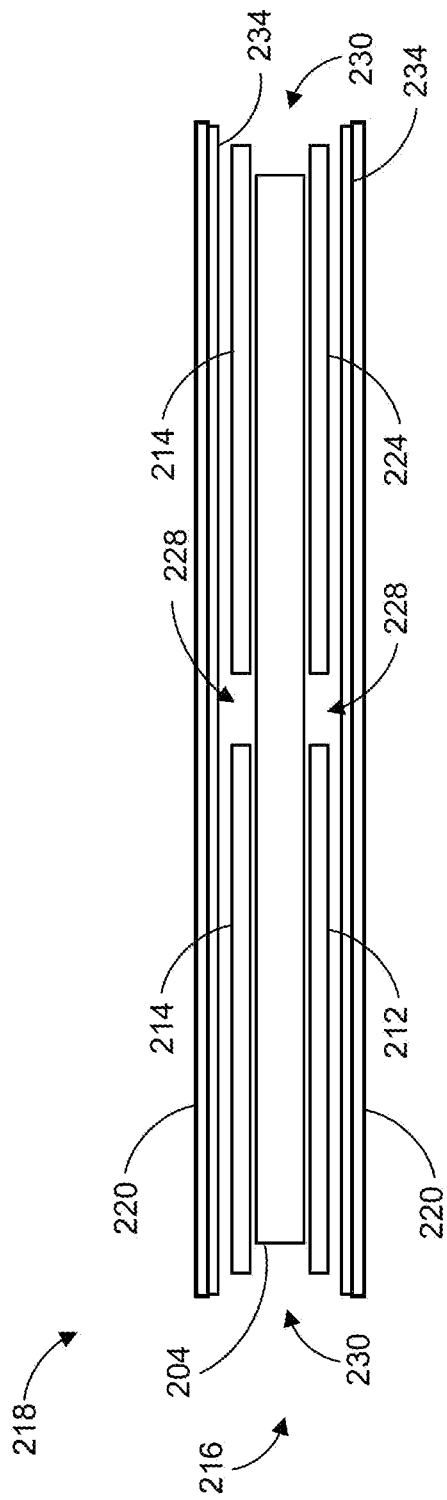
FIG. 7 is a section view of a portion of the composite board manufacturing system of FIG. 2, in accordance with some embodiments of the present disclosure.

Referring now to FIG. 7, a section view of a composite sandwich 216 within a hot press assembly 218 is shown, in accordance with some embodiments of the present disclosure. Again, it should be understood that the components are not to scale, and certain components of the system are omitted for clarity. In the embodiment shown in FIG. 7, the hot press assembly 218 does not include non-stick belts 224. Instead, the heated belts 220 may include a non-stick coating 234. The non-stick coating 234 may cover all or only a portion of the heated belt 220, similar to the non-stick belt 224 and the non-stick edge belts 232. In some embodiments, the non-stick coating 234 may be made from PTFE, PFA, FEP, or chrome. Due to manufacturing limitations, the non-stick coating 234 may be applied to the entire heated belt 220 including surfaces that do not contact the composite sandwich 216, such as the edges of the heated belt 220 and the surface of the heated belt 220 opposite the surface that contacts the composite sandwich 216. For example, the entire heated belt 220 may be submerged in a bath that coats every surface of the heated belt 220 with the non-stick coating 234 before the belt is installed in the hot press assembly 218.

Figure 8:
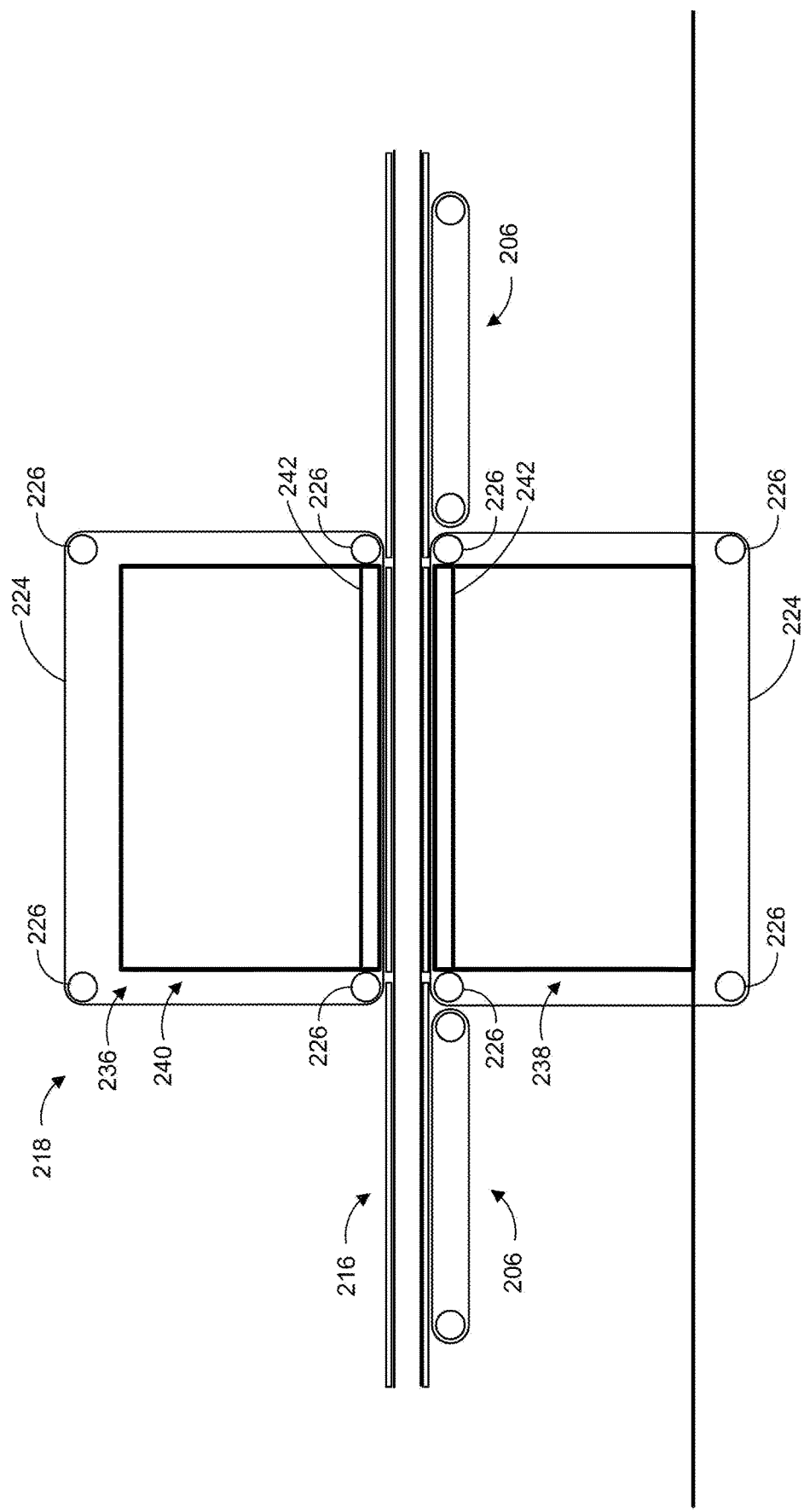
FIG. 8 is a side view illustration of a portion of a composite board manufacturing system, in accordance with some embodiments of the present disclosure.

Referring now to FIG. 8, a section view of a composite sandwich 216 within a hot press assembly 218 is shown, in accordance with some embodiments of the present disclosure. Again, it should be understood that the components are not to scale, and certain components of the system are omitted for clarity. In the embodiment shown in FIG. 7, the hot press assembly 218 includes a stationary press 236 with a base 238 and an upper portion 240. The base 238 and the upper portion 240 may each include a hot platen 242. The upper portion 240 may be configured to be raised and lowered using, for example, hydraulic pressure. The conveyor system 206 may move the composite sandwich 216 onto the hot platens 242 of the base 238, and the upper portion 240 may be lowered and pressed onto the composite sandwich 216 such that the hot platens 242 heat and compress the composite sandwich 216. The conveyor system 206 or an actuator may then move the composite sandwich 216 out of the stationary press 236 before repeating the process on another composite sandwich 216 or another portion of a continuous composite sandwich 216. In some embodiments, the stationary press 236 may include one or more non-stick belts 224 positioned between the lower hot platen 242 and the composite sandwich 216. Similar to the arrangement of the non-stick belt 224 shown in FIG. 2, the non-stick belt 224 may travel around a circuit of rollers 226. The circuit may carry the non-stick belt 224 all the way around the base 238. The floor 244 supporting the base 238 may include a cavity to allow the non-stick belt 224 to pass underneath the base 238. One or more of the rollers 226 may be powered, for example by a motor or an engine, to drive the non-stick belt 224. The lower non-stick belt 224 may thus assist the conveyor system 206 in moving the composite sandwich 216 through the hot press assembly.

Because the upper portion 240 of the stationary press 236 is lifted when the composite sandwich 216 is removed from the stationary press 236, the upper portion 240 may not require a non-stick belt 224 arranged in a circuit around the upper portion 240. For example, the upper hot platen 242 may be coated with a non-stick coating 234. In some embodiments, however, the stationary press 236 may include a non-stick belt 224 arranged in a circuit around the upper portion 240. The non-stick belt 224 arranged around the upper portion 240 of the stationary press 236 may be driven by one or more rollers 226. When the upper portion 240 is lifted, the non-stick belt 224 may be driven partially around the circuit such that a different portion of the non-stick belt 224 is pressed by the stationary press 236 in each successive pressing, which may extend the life of the non-stick belt 224. In some embodiments, after the composite sandwich 216 has been pressed, the upper portion 240 of the stationary press 236 may partially lift such that the upper non-stick belt 224 is still in contact with the composite sandwich 216 but applying a reduced amount of pressure. The upper and lower non-stick belts 224 may then cooperatively drive the composite sandwich 216 out of the stationary press 236. In other embodiments, the upper portion 240 of the stationary press 236 may lift such that the upper non-stick belt 224 is no longer in contact with the composite sandwich 216, and the lower non-stick belt 224 may drive the composite sandwich 216 out of the stationary press 236.

Figure 9:
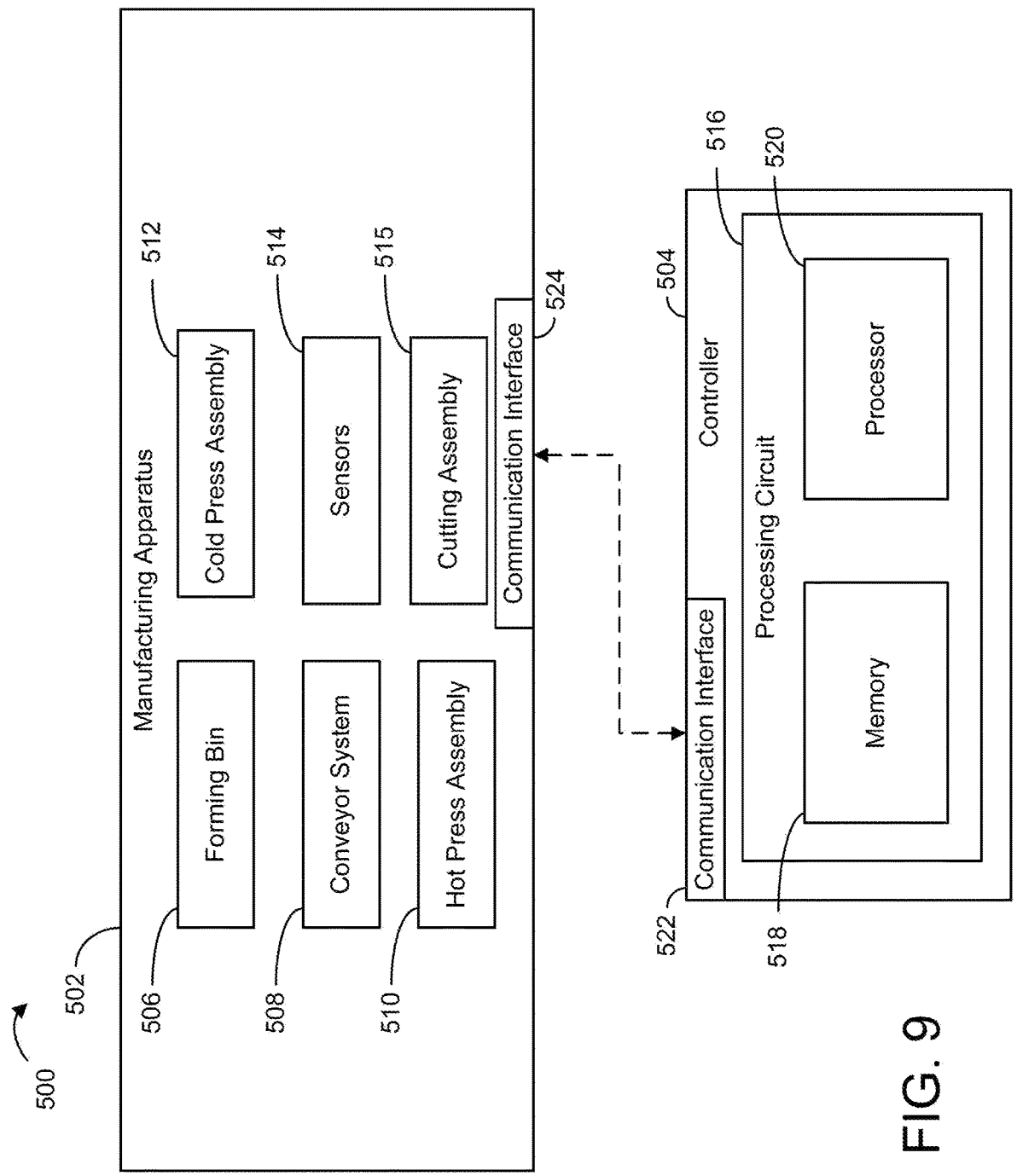
FIG. 9 is a block diagram of a composite board manufacturing system, in accordance with some embodiments of the present disclosure.

Referring now to FIG. 9, a block diagram of a composite board manufacturing system 500 is shown, in accordance with some embodiments of the present disclosure. The composite board manufacturing system 500 may be similar or equivalent to the composite board manufacturing system 200, shown and described with reference to FIG. 2. Composite board manufacturing system 500 may include a manufacturing apparatus 502 and a controller 504. Controller 504 may be a component of manufacturing apparatus 502 (e.g., a processor and/or display coupled to manufacturing apparatus 502) or may be external to manufacturing apparatus 502. Manufacturing apparatus 502 may include a forming bin 506 (e.g., similar or equivalent to the forming bin 202), a conveyor system 508 (e.g., similar or equivalent to the conveyor system 206), a hot press assembly 510 (e.g., similar or equivalent to the hot press assembly 218), a cold press assembly 512, sensors 514, and a cutting assembly 515. Controller 504 may be configured to operate manufacturing apparatus 502 to manufacture composite boards 100. In some instances, controller 504 may receive sensor data from sensors 514 that indicate one or more characteristics of a composite sandwich 216 and/or the manufacturing apparatus 502 and may adjust the operation of manufacturing apparatus 502 based on the sensor data (e.g., adjust a speed of a conveyor belt of conveyor system 508, a temperature of the heated belts of the hot press assembly 510, a temperature of the belts of the cold press assembly 512, etc.). For example, measurements from a temperature sensor configured to measure the temperature of a heated belt (e.g., heated belt 220) may be used to adjust the temperature of the belt. Measurements from a moisture sensor configured to measure the moisture content of a pressed composite sandwich 216 may be used to adjust the speed of the conveyor system 508 and the heated belts 220.

Controller 504 may include a processing circuit 516 and a communication interface 522. Processing circuit 516 may include a memory 518 and a processor 520, in some embodiments. Processing circuit 516 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 520 may include an ASIC, one or more FPGAs, a DSP, circuits containing one or more processing components, circuitry for supporting a microprocessor, a group of processing components, or other suitable electronic processing components. In some embodiments, processor 520 may execute computer code stored in memory 518 to facilitate the activities described herein. Memory 518 may be any volatile or non-volatile computer-readable storage medium capable of storing data or computer code relating to the activities. According to some embodiments, memory 518 may include computer code modules (e.g., executable code, object code, source code, script code, machine code, etc.) for execution by processor 520.

Communication interface 522 may communicate with a communication interface 524 of manufacturing apparatus 502 via any synchronous or asynchronous network. Communication interface 522 may include one or more communication interfaces that can communicate with the components of manufacturing apparatus 502. For example, controller 504 may receive data from sensors 514 and/or control conveyor system 508, hot press assembly 510, and/or cold press assembly 512 via communication interface 522. Based on such sensor data and via communication interface 522, controller 504 may transmit signals to the manufacturing apparatus 502 or devices (e.g., actuators or controllers) that operate the individual components 506-515 to cause manufacturing apparatus 502 to form a composite sandwich 216 and move the composite sandwich 216 on conveyor system 508 (e.g., by moving a conveyor belt of conveyor system 508) through the hot press assembly 510 and/or the cold press assembly 512, for example, by controlling the speed of a motor to rotate a roller configured to drive the conveyor belt. Similarly, the controller 504 may control the speed of a motor to rotate a roller configured to drive a heated belt of the hot press assembly 510. If the system includes a stationary press, the controller 504 may be configured to control a hydraulic or other linear actuator to raise and lower an upper portion of the hot press to compress a composite sandwich 216. The controller 504 may also be configured to control a saw and one or more actuators of the cutting assembly 515 to cut the composite sandwich 216 into finished composite boards 100.

Figure 10:
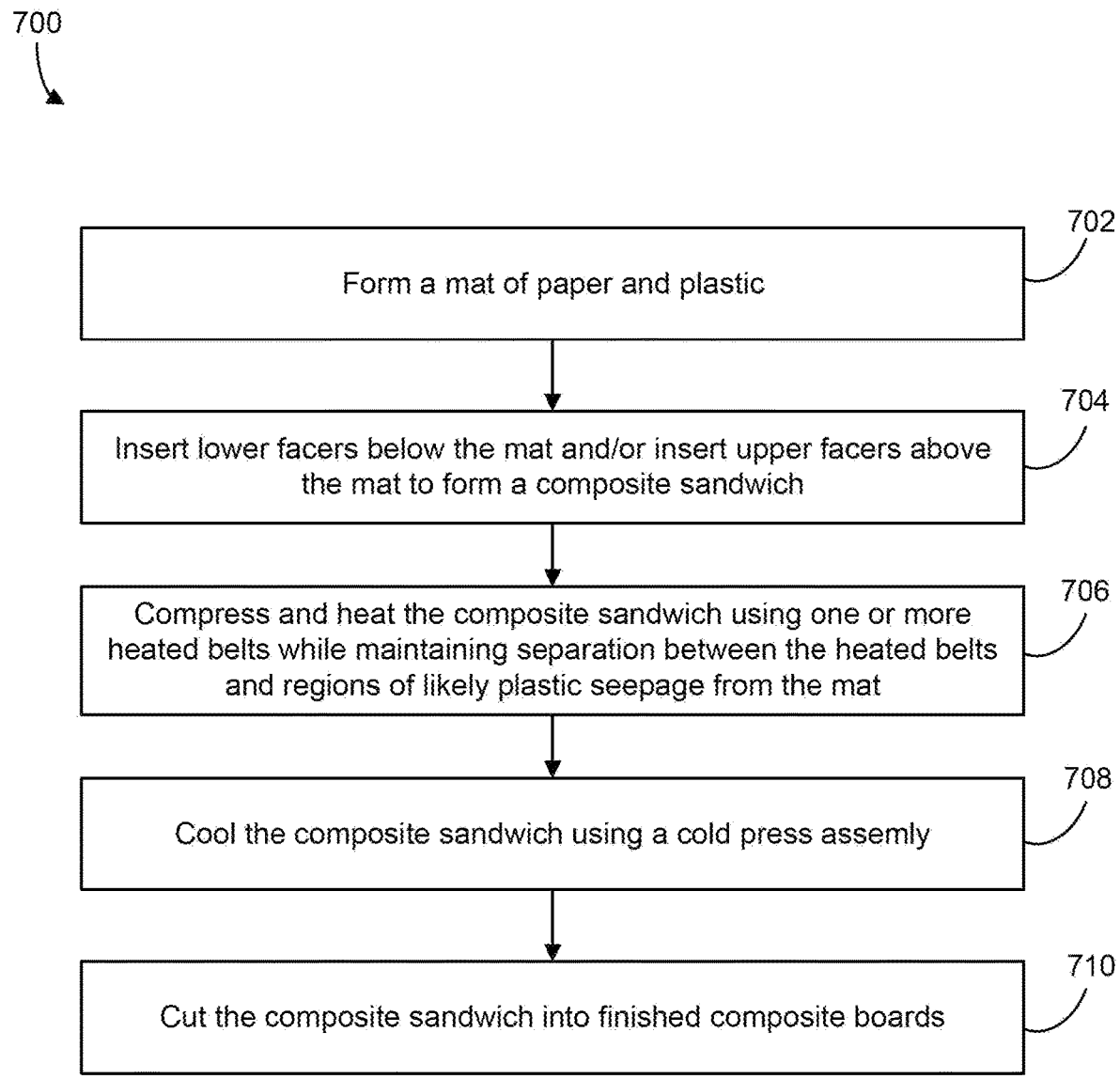
FIG. 10 is a flow diagram of an example process for forming a composite board, in accordance with some embodiments of the present disclosure.

FIG. 10 is a diagram of an example process 700 for forming a composite board 100, in accordance with some embodiments of the present disclosure. Process 700 can be performed using a composite board manufacturing system (e.g., composite board manufacturing system 200, 500), which may include a controller (e.g., controller 504). Process 700 may include more or fewer operations, and the operations may be performed in any order. Performance of process 700 may enable the composite board manufacturing system 200, 500 to manufacture, from waste materials, a composite board 100.

At operation 702 of the process 700, a mat of paper and plastic may be formed, for example, by continuously depositing a mat of paper and plastic on a conveyor belt of a conveyor system. For example, the forming bin 202 may deposit a continuous mat 204 onto a conveyor belt 208 of the conveyor system 206. The controller 504 may control the rate at which the forming bin 202 deposits material to form the continuous mat 204, for example, by controlling an actuator to widen or narrow an outlet valve of the forming bin 202. The controller 504 may simultaneously control a motor to rotate one or more rollers to ten of the conveyor system 206 to move the continuous mat 204 along the belt 208.

At operation 704 of the process 700, one or more lower facers may be inserted below the continuous mat and/or one or more upper facers may be inserted on top of the continuous mat to form a composite sandwich. For example, the lower facers 212 may be inserted between conveyor belts 208 underneath the continuous mat 204, and/or the upper facers 214 may be inserted on top of the continuous mat 204 to form a composite sandwich 216. The controller 504 may control one or more actuators or motors to insert the facers 212, 214 above and/or below the continuous mat 204. In some embodiments, two lower facers 212 may be positioned side-by-side below the continuous mat 204. Similarly, two upper facers 214 may be positioned side-by-side on top of the continuous mat 204. Each pair of facers 212, 214 may overlap, may butt up against each other, or may have a gap therebetween. In some embodiments, facers may only be positioned on one side of the mat (e.g., above or below the mat).

At operation 706 of the process 700, the composite sandwich may be heated and compressed by a hot press assembly including a heated belt, while maintaining physical separation between the heated belt and at least a first portion of the composite sandwich. For example, physical separation may be maintained between the heated belt and the composite sandwich in portions of the composite sandwich where plastic seepage from the continuous mat is likely to occur. For example, the composite sandwich 216 may be inserted into the hot press assembly 218 and compressed by the heated belts 220 positioned above and below the composite sandwich 216. Separation between the heated belt 220 and portions of the composite sandwich 216 where plastic is likely to seep out from the continuous mat 204 may be maintained by positioning a non-stick belt 224 between the heated belt 220 and the composite sandwich 216 or by applying a non-stick coating to the heated belt 220. For example, when two lower facers 212 and two upper facers 214 are each positioned side-by-side with a gap therebetween, the non-stick belts 224 may be positioned between the gaps and the heated belts 220. The non-stick belts 224 may maintain separation between the heated belts 220 and the gaps and edges of the facers 212, 214 while not maintaining separation between the heated belts 220 and the entirety of the facers 212, 214. Non-stick belts 224 may maintain separation between the heated belts 220 and the outside edges of the facers 212, 214, where plastic from the continuous mat may seep out from the edges, without maintaining separation between the heated belts 220 and the entirety of the facers 212, 214. In some embodiments, the non-stick belts 224 may be sized and positioned such that the heated belts 220 are entirely separated from and do not come into contact with the composite sandwich 216. For example, if the facers 212, 214 are porous, the non-stick belts 224 may maintain separation between the facers 212, 214 and the heated belts 220 as well as between the mat 204 and the heated belts 220. The non-stick belts 224 may be wider than the overall combined width of adjacent facers 212, 214, including any gap therebetween. As discussed above, a nonstick coating may be applied to the heated belts 220 to maintain separation between the heated belts 220 and the composite sandwich 216, rather than using non-stick belts 224. The controller 504 may control a motor to rotate a roller (e.g., a roller 222) to drive the heated belt 220 and move the composite sandwich through the hot press assembly 218.

At operation 708 of the process 700, the composite sandwich may be cooled by a cold press assembly (e.g., cold press assembly 512). The controller 504 may control one or more motors or actuators of a cold press to apply cooling plates to the composite sandwich 216 to solidify the continuous mat 204. At operation 710 of the process 700, the composite sandwich may be cut into composite boards by a cutting assembly. For example, the controller 504 may control motors and actuators of the cutting assembly 515 to cause one or more saws of the cutting assembly 515 to cut the composite sandwich 216 into finished composite boards 100. As discussed above, the facers 212, 214 may be between approximately 49 inches wide and 52 inches wide, and the continuous mat 204 may be approximately 100 inches wide. Two lower facers 212 may be positioned side-by-side underneath the continuous mat 204, and two upper facers 214 may be positioned side-by-side the top of the continuous mat 204. When the composite sandwich 216 is compressed, the continuous mat 204 may expand in width, such that the continuous mat 204 extends nearly to or beyond the outside edges of the facers 212, 214. The cutting assembly 515 can cut the composite sandwich 216 into composite boards 100 with a finished width of, for example, about 48 inches by trimming the inside and/or outside edges of the facers 212, 214. The continuous mat 204 material that was positioned in the gaps 228 between the facers 212, 214 or that extended beyond the outside edges of the facers can be trimmed off and discarded or recycled.

In an aspect, a system for producing a composite board comprising plastic and paper is provided. The system includes a hot press assembly. The hot press assembly includes a first heated belt configured to apply heat and pressure to a composite sandwich. The composite sandwich includes a mat comprising a mixture of paper and plastic and at least one facer positioned above or below the mat. The hot press assembly further includes a roller configured to drive the first heated belt to move the composite sandwich through the hot press assembly and a first non-stick belt configured to separate at least a portion of the composite sandwich from the first heated belt as the composite sandwich is moved through the hot press assembly.

In some embodiments, the hot press assembly further includes a second heated belt configured to apply heat and pressure to the composite sandwich in cooperation with the first heated belt, wherein one of the first heated belt or the second heated belt is positioned above the mat, and the other of the first heated belt or the second heated belt is positioned below the mat, and a second non-stick belt configured to separate at least a second portion of the composite sandwich from the second heated belt as the composite sandwich is moved through the hot press assembly.

In some embodiments, the first heated belt comprises a material to which melted plastic does not adhere. In some embodiments, the material is PTFE.

In some embodiments, the first heated belt has a first width, and the first non-stick belt has a second width that is approximately equal to the first width.

In some embodiments, the first non-stick belt is configured to separate an exposed portion of the mat between two adjacent facers from the first heated belt without separating the entirety of either of the two adjacent facers from the first heated belt. In some embodiments, the hot press assembly further comprises a second non-stick belt configured to separate an outside edge of one of the two adjacent facers from the first heated belt without separating the entirety of either of the two adjacent facers from the first heated belt.

In some embodiments, the first heated belt is configured to travel around a first circuit and the first non-stick belt is configured to travel around a second circuit surrounding the first circuit. In some embodiments, the first heated belt is configured to press the first non-stick belt against the composite sandwich such that the first non-stick belt travels along the second circuit as the composite sandwich moves through the hot press assembly. In some embodiments, the first non-stick belt is not configured to be driven independently of the first heated belt.

In some embodiments, the system further includes a forming bin configured to receive shredded paper and shredded plastic and to dispense the mat and a conveyor system. The conveyor system includes a conveyor belt configured to receive the mat dispensed from the forming bin and to move the mat toward the hot press assembly and a conveyor roller configured to drive the conveyor belt wherein the forming bin is configured to dispense the mat onto the conveyor belt. In some embodiments, the forming bin is configured to dispense the mat with the mat having an uncompressed width, the hot press assembly is configured to press the mat to a compressed width, and the first non-stick belt has a third width that is greater than the compressed width of the mat. In some embodiments, the system further includes a cold press configured to cool the composite sandwich after the composite sandwich is heated and pressed by the hot press assembly and a saw configured to cut the composite sandwich after the composite sandwich is cooled to form a finished composite board.

In another aspect, a method of forming a composite board comprising paper and plastic is provided. The method includes forming a composite sandwich comprising a mat of paper and plastic positioned on top of or beneath at least one facer and compressing the composite sandwich between an upper heated belt and a lower heated belt while maintaining physical separation between the heated belts and a first portion of the composite sandwich.

In some embodiments, forming the composite sandwich comprises positioning two facers side-by-side with a gap therebetween, and wherein the first portion of the composite sandwich comprises the gap. In some embodiments, physical separation is not maintained between the heated belts and the entirety of the two facers.

In some embodiments, the first portion of the composite sandwich comprises an outer edge of at least one of the facers.

In some embodiments, the at least one facer is porous and the first portion of the composite sandwich comprises an outer surface of each facer.

In some embodiments, maintaining physical separation between the heated belts and the first portion of the composite sandwich comprises positioning at least one non-stick belt between the upper heated belt or the lower heated belt and the composite sandwich. In some embodiments, the at least one facer has an overall width measured from a left edge of a leftmost facer to a right edge of a rightmost facer, and the first non-stick belt has a third width that is greater than the overall width of the at least one facer.

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for producing a composite board comprising plastic and paper, the system comprising:
    a hot press assembly comprising:
        a first heated belt configured to apply heat and pressure to a composite sandwich, the composite sandwich including a mat comprising a mixture of paper and plastic and at least one facer positioned above or below the mat;
        a roller configured to drive the first heated belt to move the composite sandwich through the hot press assembly; and
        a first non-stick belt comprising at least one of polytetrafluoroethylene, perfluoroalkoxy alkanes, or fluorinated ethylene propylene and configured to separate a portion of the composite sandwich from the first heated belt as the composite sandwich is moved through the hot press assembly, wherein the first non-stick belt centered on a centerline of the first heated belt and has a width that is smaller than a width of the first heated belt.

2. The system of claim 1, wherein the hot press assembly further comprises:
    a second heated belt configured to apply heat and pressure to the composite sandwich in cooperation with the first heated belt, wherein one of the first heated belt or the second heated belt is positioned above the mat, and the other of the first heated belt or the second heated belt is positioned below the mat; and
    a second non-stick belt configured to separate at least a second portion of the composite sandwich from the second heated belt as the composite sandwich is moved through the hot press assembly.

3. The system of claim 1, wherein the first non-stick belt is configured to separate an exposed portion of the mat between two adjacent facers from the first heated belt without separating the entirety of either of the two adjacent facers from the first heated belt.

4. The system of claim 3, wherein the hot press assembly further comprises a second non-stick belt configured to separate an outside edge of one of the two adjacent facers from the first heated belt without separating the entirety of either of the two adjacent facers from the first heated belt.

5. The system of claim 1, wherein the first heated belt is configured to travel around a first circuit and the first non-stick belt is configured to travel around a second circuit surrounding the first circuit.

6. The system of claim 5, wherein the first heated belt is configured to press the first non-stick belt against the composite sandwich such that the first non-stick belt travels along the second circuit as the composite sandwich moves through the hot press assembly.

7. The system of claim 6, wherein the first non-stick belt is not configured to be driven independently of the first heated belt.

8. The system of claim 1, further comprising:
    a forming bin configured to receive shredded paper and shredded plastic and to dispense the mat; and
    a conveyor system including:
        a conveyor belt configured to receive the mat dispensed from the forming bin and to move the mat toward the hot press assembly; and
        a conveyor roller configured to drive the conveyor belt,
    wherein the forming bin is configured to dispense the mat onto the conveyor belt.

9. The system of claim 8, further comprising:
    a cold press configured to cool the composite sandwich after the composite sandwich is heated and pressed by the hot press assembly; and
    a saw configured to cut the composite sandwich after the composite sandwich is cooled to form a finished composite board.

10. A method of forming a composite board comprising paper and plastic, the method comprising:
    forming a composite sandwich comprising a mat of paper and plastic positioned on top of or beneath at least one facer; and
    compressing the composite sandwich using a hot press assembly comprising:

a first heated belt configured to apply heat and pressure to the composite sandwich;

a roller configured to drive the first heated belt to move the composite sandwich through the hot press assembly; and a first non-stick belt comprising at least one of polytetrafluoroethylene, perfluoroalkoxy alkanes, or fluorinated ethylene propylene and configured to separate a first portion of the composite sandwich from the first heated belt as the composite sandwich is moved through the hot press assembly, wherein the first non-stick belt centered on a centerline of the first heated belt and has a width that is smaller than a width of the first heated belt.

11. The method of claim 10, wherein forming the composite sandwich comprises positioning two facers side-by-side with a gap therebetween, and wherein the first portion of the composite sandwich comprises the gap.

12. The method of claim 11, wherein physical separation is not maintained between the first heated belt and the entirety of the two facers when the composite sandwich is compressed.

13. The method of claim 10, wherein the at least one facer is porous and wherein the first portion of the composite sandwich comprises an outer surface of each facer.

14. The method of claim 10, wherein, when the composite sandwich is compressed, physical separation is maintained between the first heated belt and the first portion of the composite sandwich by positioning the first non-stick belt between the first heated belt and the composite sandwich.

15. The method of claim 11, wherein the first non-stick belt has a width that is greater than the width of the gap.

* * * * *